Figure 1:
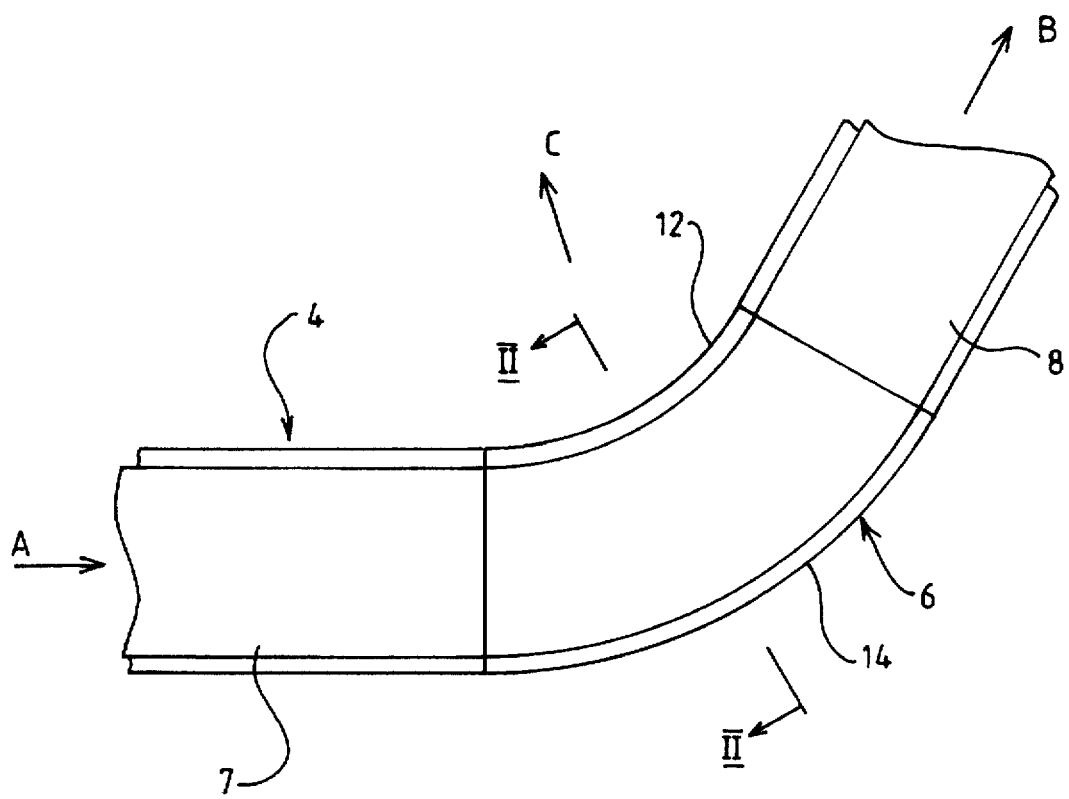

United States Patent [19]

Wells

[11] Patent Number: 5,682,975
[45] Date of Patent: Nov. 4, 1997

[54] CURVED BELT CONVEYOR

[75] Inventor: Arthur John Wells, Hertford, Great Britain

[73] Assignee: Gramac (Mechanical Handling) Limited, Hoddesdon, Great Britain

[21] Appl. No.: 633,818

[22] PCT Filed: Oct. 19, 1994

[86] PCT No.: PCT/GB94/02287

§ 371 Date: Aug. 9, 1996

§ 102(e) Date: Aug. 9, 1996

[87] PCT Pub. No.: WO95/11182

PCT Pub. Date: Apr. 27, 1995

[30] Foreign Application Priority Data

Oct. 21, 1993 [GB] United Kingdom .................. 9321728

[51] Int. Cl.⁶ .................................................. B65G 15/02
[52] U.S. Cl. .................................... 198/831; 198/838
[58] Field of Search ............................... 198/831, 838, 198/845

[56] References Cited

U.S. PATENT DOCUMENTS

| 3,951,256 | 4/1976 | Gurewitz | 198/831 |
|---|---|---|---|
| 4,202,443 | 5/1980 | Buhrer | 198/831 |
| 4,846,338 | 7/1989 | Widmer | 198/831 |
| 5,038,925 | 8/1991 | Chrysler | 198/831 |
| 5,332,082 | 7/1994 | Sommerfield | 198/831 |
| 5,332,083 | 7/1994 | Axmann | 198/831 |

FOREIGN PATENT DOCUMENTS

| 505679 A1 | 9/1992 | European Pat. Off. | 198/831 |
|---|---|---|---|
| 4113051 A | 10/1992 | Germany | 198/831 |

*Primary Examiner*—D. Glenn Dayoan
*Attorney, Agent, or Firm*—McAulay Fisher Nissen Goldberg & Kiel, LLP

[57] ABSTRACT

A corner conveyor unit (6), for use in transferring movement from a conveyor operating in the direction A to another conveyor operating in the direction B, includes a plurality of frusto conical rollers (10) mounted for rotation between inner and outer curved walls (12, 14). A device is provided to urge the outermost frusto conical rollers in a separative direction, maintaining tension on the conveyor belt 16. A device is provided to restrain the conveyor belt (16) against movement in a direction C inwardly of the corner unit, the device including a plurality of roller assemblies (18) disposed around the outer edge region of the belt (16), each roller assembly (18) having a pair of roller members (20) engaged with upper and lower trackways (22, 24). Each trackway has an upper part and a lower part b, against which the upper and lower roller member (20) of each pair engage. To facilitate belt changing, the trackway parts (22a, 24a) may be separated from the trackway parts (22b, 24b), allowing the roller assemblies (18) to pass between the trackway parts, allowing the conveyor belt to be drawn inwardly of the corner unit.

18 Claims, 2 Drawing Sheets

CURVED BELT CONVEYOR

DESCRIPTION OF INVENTION

This invention is concerned with improvements relating to conveyors, and in particular to corner units for conveyors.

Where it is necessary for a conveyor to change direction (e.g. on a bend) a corner unit is provided to transfer the conveying action from one straight run to another.

A conventional conveyor corner unit comprises a frame on which a plurality of frusto-conical rollers are mounted, with a conveyor belt entrained around the rollers. Tension is applied to the belt by separative movement of the rollers, and to restrain the belt against movement in a direction inwardly of the corner, restraining means is utilised.

A conventional construction of restraining means comprises a plurality of roller assemblies secured around the outer edge of the belt, each roller assembly comprising one roller member disposed above and one roller member disposed below the belt. In the operation of the conveyor corner unit, tension applied to the belt by the frusto-conical rollers pulls the roller assemblies against a split trackway, to restrain the belt against movement in a direction inwardly of the corner unit.

Because corner units are more complicated in their construction than straight conveyor units, they are more prone to failure, and in need of more frequency maintenance, the most common form of maintenance requiring removal of the belt from the frusto-conical rollers. In many circumstances the time over which a conveyor is out of commission for repair or maintenance can cause great difficulties, e.g., in use as part of an automated production line, or as part of a baggage handling system at an airport, and it is one of the various objects of this invention to provide a conveyor corner unit having a construction which lends itself to speedy repair.

According to this invention there is provided a conveyor corner unit of the kind having a conveyor belt entrained around frusto-conical rollers, the belt being restrained against movement in a direction inwardly of the corner by roller members secured to an outer region of the belt acting against a trackway disposed inwardly of said outer region, wherein the trackway comprises separable parts to enable the conveyor belt and the roller members thereof to be moved inwardly between said separable parts.

Preferably the trackway parts are separable generally in a plane extending at right angles of operation to the plane of operation of the conveyor. Thus if the belt operates in a generally horizontal plane, preferably said parts are separable generally vertically. In this manner when the conveyor corner unit is in need of repair, by effecting such separation of the trackway parts, the conveyor belt may be moved inwardly of the corner unit from the rollers thereof, and repair, maintenance or replacement effected relatively quickly.

Preferably the belt is so constrained against movement in both directions of its reach—i.e. upper and lower reaches of a conveyor operating in the horizontal plane, and preferably two trackways are provided for engagement with the roller means of the belt.

Preferably both trackways comprise separable parts, and preferably means is provided, such as over centre device, to facilitate such separation.

Preferably separation is effected simultaneously, and conveniently one part of one of said trackways is mounted for movement with one part of the other trackway. Preferably the other part of each trackway is fixedly secured to a frame of the conveyor corner unit.

There will now be given a detailed description, to be read with reference to the accompanying drawings, of a conveyor corner unit which is the preferred embodiment of this invention, having been selected for the purposes of illustrating the invention by way of example.

Figure 2:
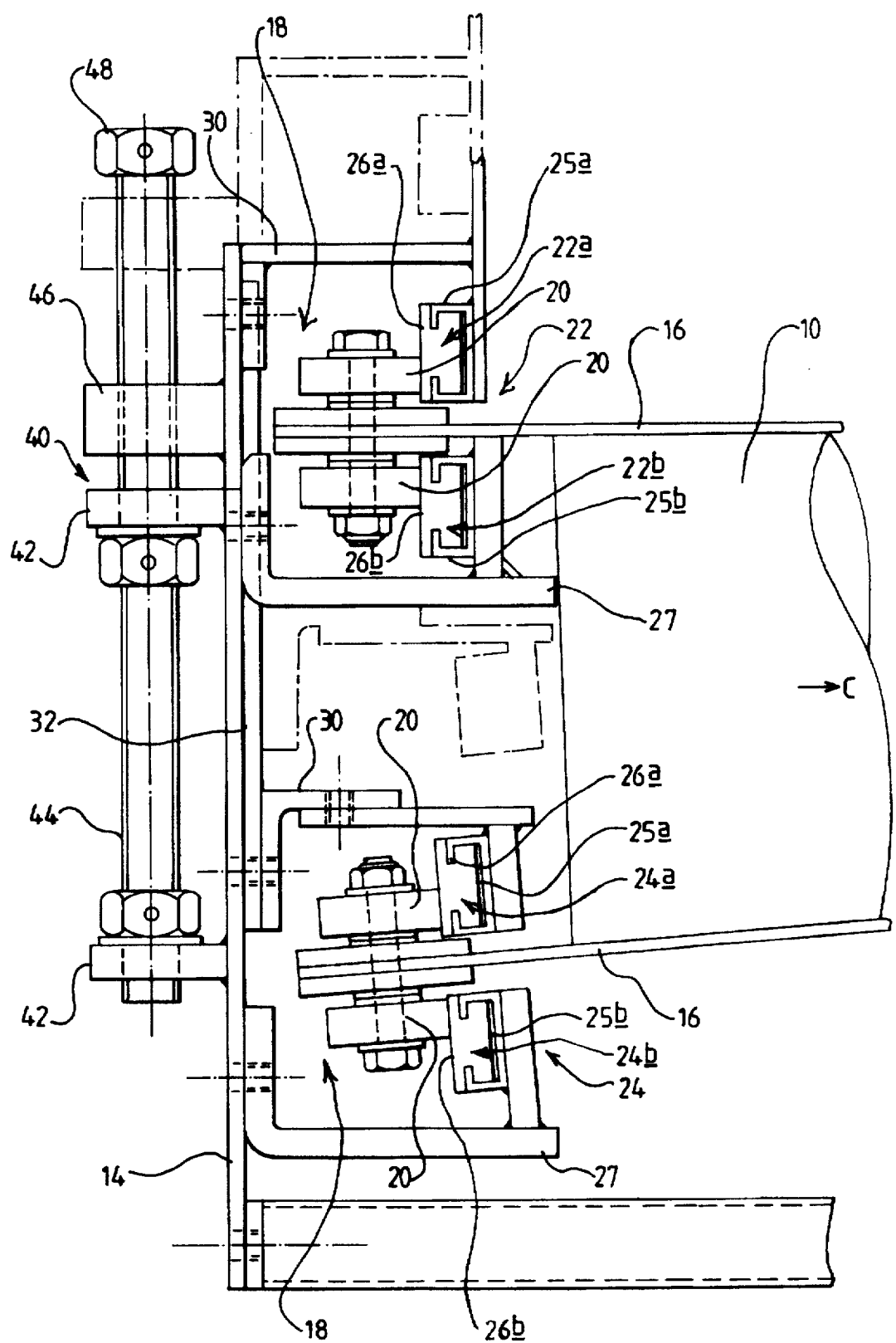

In the accompanying drawings:

FIG. 1 is a schematic plan view of a conveyor of which the preferred embodiments form a part; and FIG. 2 is a sectional view taken on the line 2—2 of FIG. 1.

The conveyor corner unit 6 which is the preferred embodiment of the invention is used as part of a conveyor 4 (FIG. 1), the corner unit transferring the movement from direction A, effected by linear conveyor 7 to direction B, effected by linear conveyor 8, around a bend which may be of any appropriate angle, typically being between 45° and 90°.

The corner unit 6 comprises a plurality of frusto-conical rollers 10 mounted for rotation between inner and outer curved walls 12, 14 respectively, means (not shown) being provided to urge one or both the outermost frusto-conical rollers in a separative direction, to maintain a tension on the conveyor belt 16.

In conventional manner means is provided to restrain the conveyor belt 16 against movement in a direction inwardly of the corner unit (i.e. in the direction of the arrow C), such means being afforded by a plurality of roller assemblies 18 disposed around the outer edge region of the belt 16. Each roller assembly 18 comprises a pair of roller members 20 mounted for movement around a common axis extending at right angles to the plane of the belt, tension in the belt pulling the roller members against upper and lower trackways 22, 24.

Each trackway comprises upper and lower parts designed a and b respectively, against which the upper and lower roller members of each pair engage. For convenience of maintenance each track comprises a frame member 25 into which a bearing member 26, which conveniently comprises a low friction material such a nylon or PTFE, is releasably mounted.

Each lower part 22b, 22b of the trackways is secured to a bracket 27 fixed to the outer wall 14 of the conveyor corner unit, whilst each upper part 22a, 24a of the trackway is secured by a bracket 30 mounted on a slide plate 32 mounted for sliding movement on the inner side of the outer wall 14. Locking means 40 is provided to secure the trackway parts 22a, 22b in their desired positions, the locking means 40 comprising a pair of lugs 42 extending outwardly from the wall 14, and through which a bolt 44 extends, a lug 46 secured to the slide plate 32 being slidably received on an upper portion of said bolt 44, a locking nut 48 being provided to secure the lug 46 in a position adjacent to the lug 42, and hence the parts 22a, 24a of the trackways in a desired position in relation to the parts 22a, 24b.

On the occurrence of a need to change the belt of the conveyor, the nut 48 may be slackened, and the slide plate 32 lifted relative to the wall 14, the lug 46 moved upwardly on the bolt 44, causing the trackway parts 22a, 24a to separate from the trackway parts 22b, 24b. Shown generally in dotted lines in FIG. 2. Such separation allows the roller assemblies 18 to pass between the said trackway parts, allowing the conveyor belt to be drawn on both upper and lower reaches from the frame in the direction C inwardly of the corner unit. Necessary repair or maintenance which may typically be replacement of one of the roller assemblies, or replacement of the bearing strip 26, of effective repair to the belt itself, may then be carried out relatively easily, prior to the remounting of the conveyor belt on the frusto-conical rollers 10, and return of the trackway parts of their FIG. 2 positions. Finally, the end most roller 10 may be moved outwardly to tension the belt, prior to recommencement of use of the conveyor system.

If desired the locking means 40 illustrated in FIG. 2 may be replaced by an over centre mechanism, whereby desired separative movement between the trackway parts may be obtained relatively quickly, conveniently a plurality (such as two or three) such over centre devices being spaced around the periphery of the outer wall 14.

Additionally whilst in the preferred embodiment the invention has been described in relation to obtaining separative movement of the trackway parts of both reaches in the same direction (viz, the upper parts of each trackway are moved vertically upwardly in separation of the lower trackway parts) if desired the upper trackway part of the upper reach, and the lower trackway part of the lower reach may be moved away from the axis of the frusto-conical roller, or the lower part of the upper reach and the upper part of the lower reach may be moved towards the axis of the frusto-conical roller, similarly obtaining separation of the trackway parts as may accommodate inward movement of the roller assemblies 20.

The features disclosed in the foregoing description, or the following claims, or the accompanying drawings, expressed in their specific forms or in terms of a means for performing the disclosed function, or a method or process for attaining the disclosed result, as appropriate, may, separatively or in any combination of such features, be utilised for realising the invention in diverse forms thereof.

I claim:

1. A conveyor corner unit comprising a conveyor (16) entrained around frusto conical rollers (10), the belt being restrained against movements in a direction inwardly of the corner by roller members (20) secured to an outer region of the belt acting against a trackway (22, 24) disposed inwardly of said outer region, characterised in that the trackway comprises trackway parts (22a, 22a, 22b, 24b) mounted for relative movement between operative positions and separated positions in which separated positions the conveyor belt (10) and the roller members (20) thereof may be moved inwardly between said separated trackway parts, and separating means (40, 46, 48) to effect movement of said parts from said operative positions to said separated positions, and from said separated positions to said operative positions.

2. A conveyor corner unit according to claim 1 wherein one of said trackway parts (22b, 22b) is mounted on a slide plate (32) for sliding movement on an inner wall (14) of the corner unit.

3. A conveyor corner unit according to claim 1 wherein said separating means comprises locking means (46, 48) to lock the trackway parts in their operative positions.

4. A conveyor corner unit according to claim 1 wherein said separating means comprises over centre mechanism whereby separative movement between the trackway parts may be obtained relatively quickly.

5. A conveyor corner unit according to claim 4 wherein said over centre mechanism comprises a plurality of over centre devices spaces around the periphery of the unit.

6. A unit according to claim 1 wherein the trackway parts (22a, 24a, 22b, 24b) are separable generally in a plane extending at right angles to the plane of operation of the conveyor.

7. A unit according to claim 1 wherein upper and lower reaches of the conveyor operate in a horizontal plane, and two trackways (22, 24) are provided for engagement with the roller means (20) of each reach the belt, both trackways comprising separable parts (a,b), mounted for movement between operative and separated positions, said separating means (40, 46, 48) facilitating separation of both parts of each trackway.

8. A unit according to claim 7 wherein said means is operative to effect separation of said trackway parts simultaneously, one part (22a) of one of said trackways (22) being mounted for movement with one part (24a) of the other trackway (24).

9. A unit according to claim 8 wherein the other part (22b, 22b) of each trackway is fixedly secured to a frame (14) of the conveyor corner unit.

10. A conveyor corner unit according to claim 2 wherein said separating means comprises locking means to lock the trackway parts in their operative positions.

11. A unit according to claim 2 wherein upper and lower reaches of the conveyor operate in a horizontal plane, and two trackways are provided for engagement with the roller means of each reach the belt, both trackways comprising separable parts, mounted for movement between operative and separated positions, said separating means facilitating separation of both parts of each trackway.

12. A unit according to claim 3 wherein upper and lower reaches of the conveyor operate in a horizontal plane, and two trackways are provided for engagement with the roller means of each reach the belt, both trackways comprising separable parts, mounted for movement between operative and separated positions, said separating means facilitating separation of both parts of each trackway.

13. A unit according to claim 4 wherein upper and lower reaches of the conveyor operate in a horizontal plane, and two trackways are provided for engagement with the roller means of each reach the belt, both trackways comprising separable parts, mounted for movement between operative and separated positions, said separating means facilitating separation of both parts of each trackway.

14. A unit according to claim 5 wherein upper and lower reaches of the conveyor operate in a horizontal plane, and two trackways are provided for engagement with the roller means of each reach the belt, both trackways comprising separable parts, mounted for movement between operative and separated positions, said separating means facilitating separation of both parts of each trackway.

15. A unit according to claim 6 wherein upper and lower reaches of the conveyor operate in a horizontal plane, and two trackways are provided for engagement with the roller means of each reach the belt, both trackway comprising separable parts, mounted for movement between operative and separated positions, said separating means facilitating separation of both parts of each trackway.

16. A unit according to claim 10 wherein upper and lower reaches of the conveyor operate in a horizontal plane, and two trackways are provided for engagement with the roller means of each reach the belt, both trackways comprising separable parts, mounted for movement between operative and separated positions, said separating means facilitating separation of both parts each trackway.

17. A conveyor corner unit according to claim 2 wherein said separating means comprises over centre mechanism whereby separative movement between the trackway parts may be obtained relatively quickly.

18. A conveyor corner unit according to claim 3 wherein said separating means comprises over centre mechanism whereby separative movement between the trackway parts may be obtained relatively quickly.

* * * * *